United States Patent
Yeh et al.

(10) Patent No.: US 9,004,725 B2
(45) Date of Patent: Apr. 14, 2015

(54) LIGHTING DEVICE WITH ELECTROWETTING LIQUID LENS WITH HEAT DISSIPATION

(75) Inventors: Jer-Liang Yeh, Taichung (TW); Chun-Wen Chen, Tainan (TW)

(73) Assignee: Lustrous Technology Ltd., New Taipei (TW)

( * ) Notice: Subject to any disclaimer, the term of this patent is extended or adjusted under 35 U.S.C. 154(b) by 296 days.

(21) Appl. No.: 13/567,147

(22) Filed: Aug. 20, 2012

(65) Prior Publication Data
US 2014/0049945 A1    Feb. 20, 2014

(51) Int. Cl.
  *F21V 29/00*    (2006.01)
  *F21V 5/04*    (2006.01)
  *G02B 3/00*    (2006.01)
  *G02B 3/14*    (2006.01)
  *G02B 26/00*    (2006.01)
  *F21Y 101/02*    (2006.01)

(52) U.S. Cl.
  CPC .................. *F21V 5/048* (2013.01); *F21V 29/58* (2013.01); *F21Y 2101/02* (2013.01); *G02B 3/00* (2013.01); *G02B 3/14* (2013.01); *G02B 26/004* (2013.01)

(58) Field of Classification Search
  USPC ......... 362/512, 513, 277, 278, 318, 319, 320; 257/98, E33.068; 359/666
  See application file for complete search history.

(56) References Cited

U.S. PATENT DOCUMENTS

| | | | | |
|---|---|---|---|---|
| 6,369,954 B1 * | 4/2002 | Berge et al. | | 359/666 |
| 7,298,559 B2 * | 11/2007 | Kato et al. | | 359/666 |
| 7,522,345 B2 * | 4/2009 | Oh et al. | | 359/665 |
| 7,605,984 B2 * | 10/2009 | Yeh et al. | | 359/666 |
| 7,658,528 B2 * | 2/2010 | Hoelen et al. | | 362/555 |
| 7,791,815 B2 * | 9/2010 | Weikart et al. | | 359/666 |
| 7,929,218 B2 * | 4/2011 | Mohr et al. | | 359/665 |
| 7,936,520 B2 * | 5/2011 | Yeh | | 359/666 |
| 8,149,513 B2 * | 4/2012 | Wang et al. | | 359/666 |
| 2005/0041301 A1 * | 2/2005 | Kibayashi | | 359/666 |
| 2009/0103185 A1 * | 4/2009 | Helwegen et al. | | 359/666 |
| 2010/0046084 A1 * | 2/2010 | Kirita et al. | | 359/666 |
| 2010/0277923 A1 * | 11/2010 | Takai et al. | | 362/296.01 |

* cited by examiner

*Primary Examiner* — Ismael Negron
(74) *Attorney, Agent, or Firm* — The Weintraub Group, P.L.C.

(57) ABSTRACT

A lighting device capable of changing light patterns, includes: (a) a heat dissipating substrate; (b) a light source, located on the heat dissipating substrate; (c) a first dielectric liquid, covering the light source and having a first dielectric constant; (d) a second dielectric liquid, covering the first dielectric liquid and having a second dielectric constant; and (e) an enclosing wall, located on the heat dissipating substrate for containing the first dielectric liquid and the second dielectric liquid.

20 Claims, 5 Drawing Sheets

0V

30V

60V

US 9,004,725 B2

LIGHTING DEVICE WITH ELECTROWETTING LIQUID LENS WITH HEAT DISSIPATION

BACKGROUND OF THE INVENTION

1. Field of the Invention

The present invention relates to a lighting device, and more particularly to a lighting device capable of changing light patterns.

2. Description of the Related Art

U.S. Pat. No. 6,986,593 discloses a lighting device using a reflector and a primary lens to shape a light pattern. However, as the light pattern of this prior art is controlled by using a motor to drive a cylinder to determine a focal length, its power consumption can't be small, and its structure is kind of awkward.

Recently, tunable lenses such as tunable liquid crystal microlenses or tunable optofluidic devices (TOD) using liquid lenses have been utilized in providing variable light patterns. However, heat dissipation can be an issue for lighting devices utilizing tunable lenses. The performance of the light source of a lighting device utilizing a tunable lens can be compromised if the heat of the light source is not dissipated efficiently. Take LEDs for example. The junction temperature of an LED can affect the lighting efficiency and lifetime of the LED. With the junction temperature increasing 10° C., the lifetime will reduce 25% and the lighting efficiency will drop 2.5%.

To tackle the heat dissipation issue, US patent Pub. No. 2010/0277923 locates a light source atop a liquid lens element. The liquid lens element includes a main body having a liquid chamber formed therein. A lens surface changes orientation of light that exits the light exiting surface by being electrically deformed, and the lens surface is formed of an interface between two liquids that are contained in the liquid chamber and have different refractive indexes. A first liquid of the two liquids is conductive, and an electorwetting force caused by a voltage can be acting on the first liquid to change the curvature of the lens surface.

However, as the light source and the liquid lens element of US patent Pub. No. 2010/0277923 are located in different compartments, the electrical wiring for the light source and the liquid lens element is not convenient, and the overall structure is not compact enough.

In view of the foregoing problems, a more compact and efficient lighting device is therefore needed.

SUMMARY OF THE INVENTION

One objective of the present invention is to provide a lighting device capable of changing light patterns, which has a compact structure.

Another objective of the present invention is to provide a lighting device capable of changing light patterns, which can increase the lighting efficiency of the lighting device by incorporating a light source in a dielectric liquid lens.

Still another objective of the present invention is to provide a lighting device capable of changing light patterns, which can greatly improve the heat dissipation capacity of the lighting device by letting a dielectric liquid lens serve both the functions of shaping a light pattern and taking away the heat generated from a light source.

To achieve the foregoing objectives, the present invention provides a lighting device capable of changing light patterns, the lighting device including:

a heat dissipating substrate;
a light source, located on the heat dissipating substrate;
a first dielectric liquid, covering the light source and having a first dielectric constant;
a second dielectric liquid, covering the first dielectric liquid and having a second dielectric constant, wherein the second dielectric constant is higher than the first dielectric constant; and
an enclosing wall, located on the heat dissipating substrate for containing the first dielectric liquid and the second dielectric liquid.

In one embodiment, the heat dissipating substrate includes aluminum.

In one embodiment, the light source includes a light emitting diode or a light emitting diode chip.

In one embodiment, the first dielectric liquid is a silicone oil liquid and the second dielectric liquid is an alcohol liquid.

In one embodiment, the lighting device capable of changing light patterns further includes at least two electrodes on the heat dissipating substrate for applying a voltage to generate a dielectric force onto the first dielectric liquid.

In one embodiment, the lighting device capable of changing light patterns further includes a transparent cover located on the enclosing wall.

In one embodiment, the transparent cover is made of glass or resin.

In one embodiment, the enclosing wall is made of plastics or aluminum oxide.

In one embodiment, the enclosing wall has an inner surface coated with a reflective film or a fluorescent powder.

To achieve the foregoing objectives, the present invention further provides a lighting device capable of changing light patterns, the lighting device including:

a heat dissipating substrate;
a light source, located on the heat dissipating substrate;
an enclosing wall, located on the heat dissipating substrate;
a first dielectric liquid, located inside the enclosing wall, covering the light source, and having a first dielectric constant; and
a second dielectric liquid, located inside the enclosing wall, covering the first dielectric liquid, and having a second dielectric constant, wherein the first dielectric constant is higher than the second dielectric constant.

In one embodiment, the heat dissipating substrate includes aluminum.

In one embodiment, the light source includes a light emitting diode or light emitting diode chip.

In one embodiment, the first dielectric liquid is an alcohol liquid, and the second dielectric liquid is a silicone oil liquid.

In one embodiment, the lighting device capable of changing light patterns further includes at least two electrodes on the heat dissipating substrate for applying a voltage to generate a dielectric force onto the first dielectric liquid.

In one embodiment, the lighting device capable of changing light patterns further includes a transparent cover located on the enclosing wall, wherein the enclosing wall is made of plastics or aluminum oxide, and the transparent cover is made of glass or resin.

In one embodiment, the enclosing wall has an inner surface coated with a reflective film or a fluorescent powder.

To achieve the foregoing objectives, the present invention further provides a lighting device capable of changing light patterns, the lighting device including:

a heat dissipating substrate;
a light source, located on the heat dissipating substrate;
an enclosing wall, located on the heat dissipating substrate;

a first dielectric liquid, located inside the enclosing wall, covering the light source, and having a first dielectric constant;

a second dielectric liquid, located inside the enclosing wall and atop the first dielectric liquid, and having a second dielectric constant;

a transparent cover, located on the enclosing wall; and at least two electrodes, located on a bottom face of the transparent cover for applying a voltage to generate a dielectric force onto the second dielectric liquid.

In one embodiment, the first dielectric liquid is an alcohol liquid, and the second dielectric liquid is a silicone oil liquid.

In one embodiment, the first dielectric liquid is a silicone oil liquid, and the second dielectric liquid is an alcohol liquid.

In one embodiment, the heat dissipating substrate comprises aluminum, and the light source comprises a light emitting diode or light emitting diode chip.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiment of the invention.

Figure 1A:
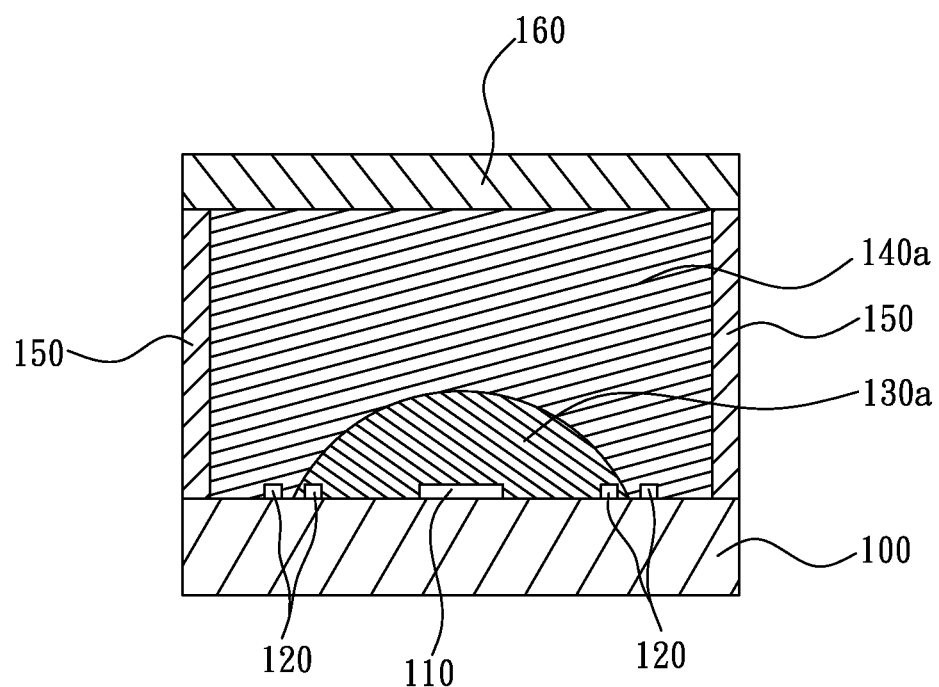
FIG. 1a illustrates a cross sectional view of a lighting device capable of changing light patterns according to a preferred embodiment of the present invention.

Please refer to FIG. 1a, which illustrates a cross sectional view of a lighting device capable of changing light patterns according to a preferred embodiment of the present invention. As illustrated in FIG. 1a, the lighting device capable of changing light patterns includes a heat dissipating substrate 100, a light source 110, electrodes 120, a first dielectric liquid 130a, a second dielectric liquid 140a, an enclosing wall 150, and a transparent cover 160.

The heat dissipating substrate 100 is preferably but not limited to an aluminum substrate to facilitate dissipating heat generated by the light source 110.

The light source 110, located on the heat dissipating substrate 100, preferably includes an LED (light emitting diode) or LED chip.

The electrodes 120 are located on the heat dissipating substrate 100 for applying a voltage to generate a dielectric force onto the first dielectric liquid 130a. The dielectric force can shape the curvature of the first dielectric liquid 130a to result in a desired focal length.

The first dielectric liquid 130a covers the light source 110 and has a first dielectric constant. The second dielectric liquid 140a covers the first dielectric liquid 130a and has a second dielectric constant, and the second dielectric constant is higher than the first dielectric constant. Besides, the density of the first dielectric liquid 130a is preferably equal to that of the second dielectric liquid 140a, wherein the first dielectric liquid 130a is preferably a silicone oil liquid, and the second dielectric liquid 140a is preferably an alcohol liquid, and both of them are non-conductive.

The enclosing wall 150, located on the heat dissipating substrate 100 for containing the first dielectric liquid 130a and the second dielectric liquid 140a. The enclosing wall 150 can be made of aluminum oxide or plastics. The inner surface of the enclosing wall 150 can be coated with a reflective film to increase the light output. In some applications, the inner surface of the enclosing wall 150 can be further coated with a fluorescent powder to provide a light mixing effect for the light source 110. For example, the fluorescent powder can be of yellow color when the light source 110 is of blue color to produce a white light output.

The transparent cover 160 is located on the enclosing wall 150 and can be made of glass or resin.

When in operation, the light pattern of the lighting device of FIG. 1a is programmable by controlling the voltage on the electrodes 120, and the heat generated by the light source 110 can be dissipated rapidly by the first dielectric liquid 130a, the second dielectric liquid 140a, and the heat dissipating substrate 100.

It is to be noted that, thanks to the present invention's special design of using two non-conductive liquids, the light source 110 can be located therein to have the liquids help dissipating the heat, and, by this arrangement, the light source 110 is as if located in a heat pipe having a liquid inside, which is very powerful in dissipating heat. In contrast, this advantage will not be achievable in a lighting device incorporating a conventional electrowetting liquid lens due to a fact that, the conventional electrowetting liquid lens uses a conductive liquid for forming a lens, and a short circuit can take place if the light source is placed in the conductive liquid.

Besides, as the light source 110 is located in a liquid lens consisting of the first dielectric liquid 130a and the second dielectric liquid 140a, a compact structure can be derived, and the lighting efficiency of the lighting device can be increased thereby.

Figure 1B:
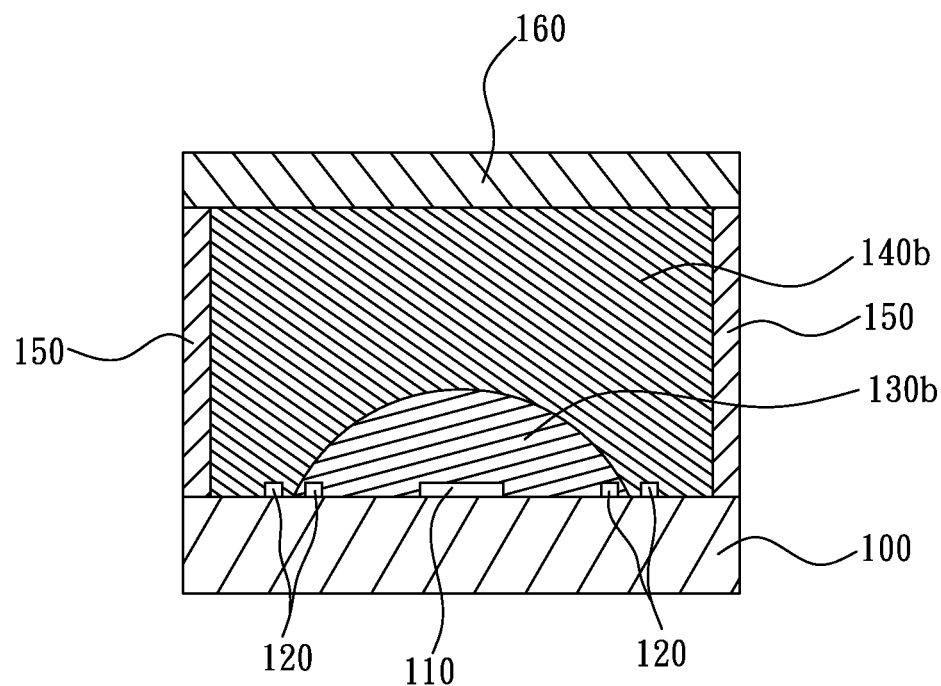
FIG. 1b illustrates a cross sectional view of a lighting device capable of changing light patterns according to another preferred embodiment of the present invention.

Based on the principle specified above, the present invention further proposes other embodiments. Please refer to FIG. 1b, which illustrates a cross sectional view of a lighting device capable of changing light patterns according to another preferred embodiment of the present invention. As illustrated in FIG. 1b, the lighting device capable of changing light patterns includes a heat dissipating substrate 100, a light source 110, electrodes 120, a first dielectric liquid 130b, a second dielectric liquid 140b, an enclosing wall 150, and a transparent cover 160.

The heat dissipating substrate 100 is preferably but not limited to an aluminum substrate to facilitate dissipating heat generated by the light source 110.

The light source 110, located on the heat dissipating substrate 100, preferably includes an LED or LED chip.

The electrodes 120 are located on the heat dissipating substrate 100 for applying a voltage to generate a dielectric force onto the first dielectric liquid 130b. The dielectric force can shape the curvature of the first dielectric liquid 130b to result in a desired focal length.

The first dielectric liquid 130b covers the light source 110 and has a first dielectric constant. The second dielectric liquid 140b covers the first dielectric liquid 130b and has a second dielectric constant, and the second dielectric constant is lower than the first dielectric constant. Besides, the density of the first dielectric liquid 130b is preferably equal to that of the second dielectric liquid 140b, wherein the first dielectric liquid 130b is preferably an alcohol liquid, and the second dielectric liquid 140b is preferably a silicone oil liquid.

The enclosing wall 150, located on the heat dissipating substrate 100 for containing the first dielectric liquid 130b and the second dielectric liquid 140b. The enclosing wall 150 can be made of aluminum oxide or plastics. The inner surface of the enclosing wall 150 can be coated with a reflective film to increase the light output. In some applications, the inner surface of the enclosing wall 150 can be further coated with a fluorescent powder to provide a light mixing effect for the light source 110. For example, the fluorescent powder can be of yellow color when the light source 110 is of blue color to produce a white light output.

The transparent cover 160 is located on the enclosing wall 150 and can be made of glass or resin.

Figure 2:
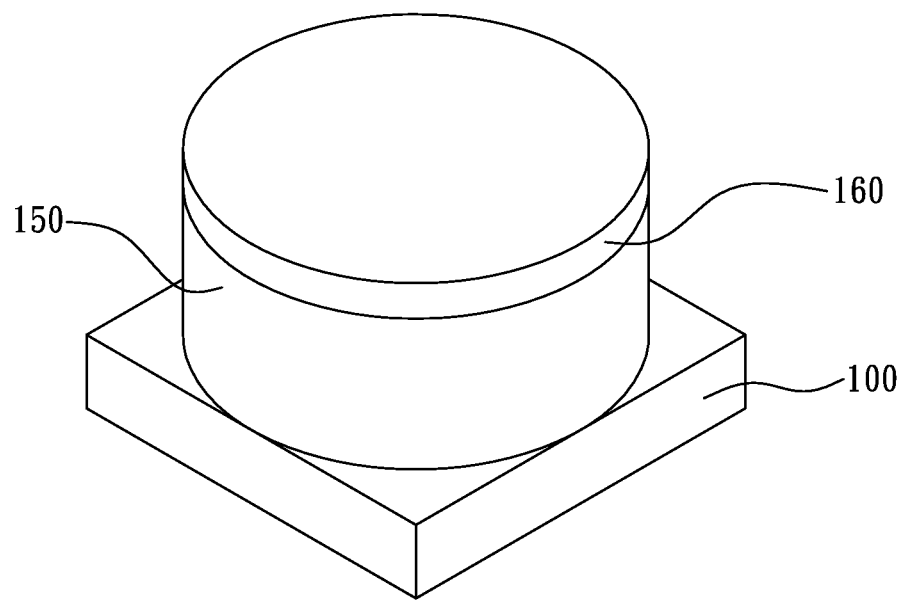
FIG. 2 illustrates a perspective view of the lighting device capable of changing light patterns disclosed in FIG. 1a or FIG. 1b.

Please refer to FIG. 2, which illustrates a perspective view of the lighting device capable of changing light patterns disclosed in FIG. 1a or FIG. 1b. As illustrated in FIG. 2, the enclosing wall 150 and the transparent cover 160 form a cylinder, and the heat dissipating substrate 100 is rectangular. Apart from this arrangement, other shapes can also be used for the heat dissipating substrate 100 and the enclosing wall 150. For example, the heat dissipating substrate 100 can be of a round shape, and the enclosing wall 150 can take the shape of a polygonal cylinder.

Figure 3A:
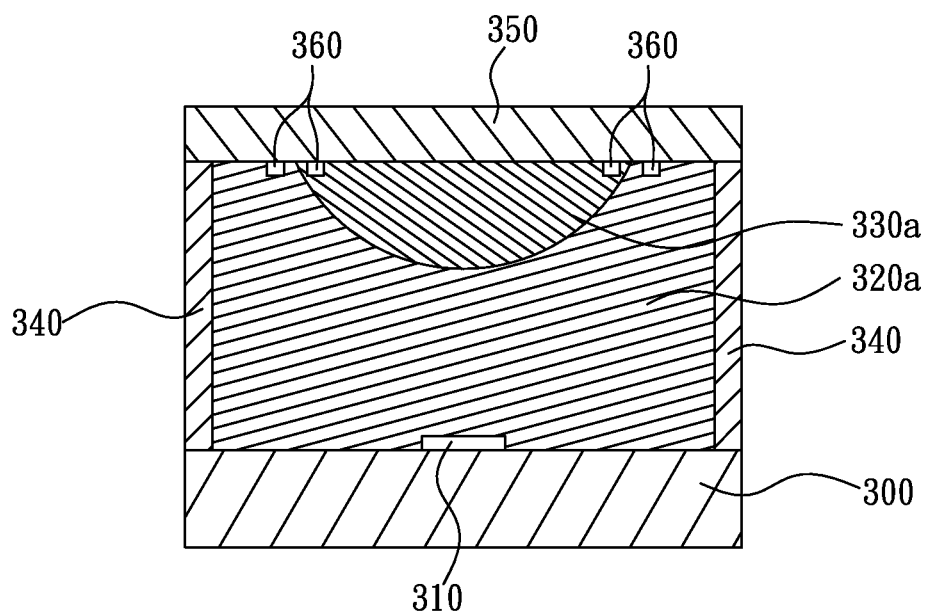
FIG. 3a illustrates a cross sectional view of a lighting device capable of changing light patterns according to still another preferred embodiment of the present invention.

Please refer to FIG. 3a, which illustrates a cross sectional view of a lighting device capable of changing light patterns according to still another preferred embodiment of the present invention. As illustrated in FIG. 3a, the lighting device capable of changing light patterns includes a heat dissipating substrate 300, a light source 310, a first dielectric liquid 320a, a second dielectric liquid 330a, an enclosing wall 340, a transparent cover 350, and electrodes 360.

The heat dissipating substrate 300 is preferably but not limited to an aluminum substrate to facilitate dissipating heat generated by the light source 310.

The light source 310, located on the heat dissipating substrate 300, preferably includes an LED or LED chip.

The first dielectric liquid 320a covers the light source 310 and has a first dielectric constant. The second dielectric liquid 330a is located atop the first dielectric liquid 320a and has a second dielectric constant, and the second dielectric constant is lower than the first dielectric constant. Besides, the density of the first dielectric liquid 320a is preferably equal to that of the second dielectric liquid 330a, wherein the first dielectric liquid 320a is preferably an alcohol liquid, and the second dielectric liquid 330a is preferably a silicone oil liquid.

The enclosing wall 340, located on the heat dissipating substrate 300 for containing the first dielectric liquid 320a and the second dielectric liquid 330a. The enclosing wall 340 can be made of aluminum oxide or plastics. The inner surface of the enclosing wall 340 can be coated with a reflective film to increase the light output. In some applications, the inner surface of the enclosing wall 340 can be further coated with a fluorescent powder to provide a light mixing effect for the light source 310. For example, the fluorescent powder can be of yellow color when the light source 310 is of blue color to produce a white light output.

The transparent cover 350 is located on the enclosing wall 340 and can be made of glass or resin.

The electrodes 360 are located on a bottom face of the transparent cover 350 for applying a voltage to generate a dielectric force onto the second dielectric liquid 330a. The dielectric force can shape the curvature of the second dielectric liquid 330a to result in a desired focal length.

Figure 3B:
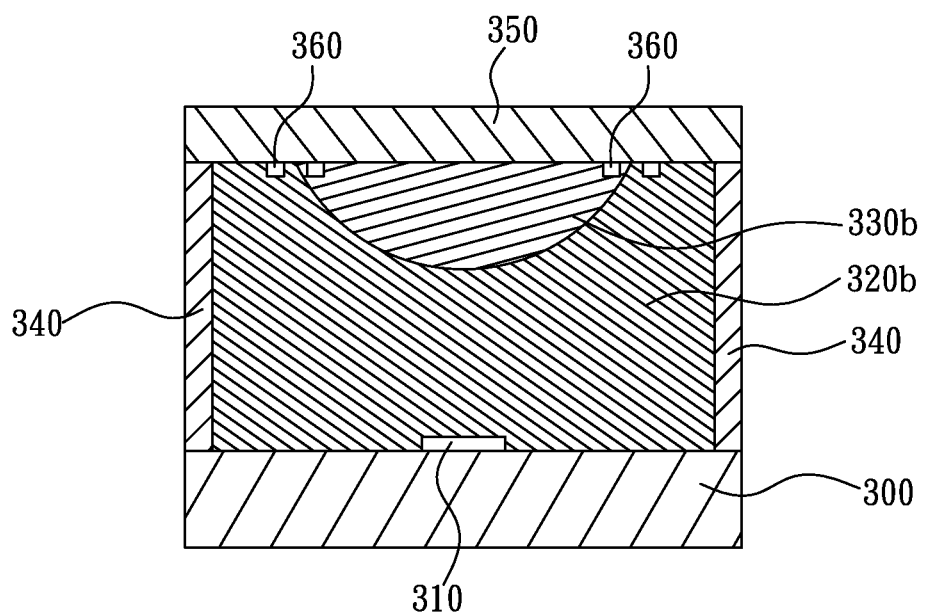
FIG. 3b illustrates a cross sectional view of a lighting device capable of changing light patterns according to still another preferred embodiment of the present invention.

Please refer to FIG. 3b, which illustrates a cross sectional view of a lighting device capable of changing light patterns according to still another preferred embodiment of the present invention. As illustrated in FIG. 3b, the lighting device capable of changing light patterns includes a heat dissipating substrate 300, a light source 310, a first dielectric liquid 320b, a second dielectric liquid 330b, an enclosing wall 340, a transparent cover 350, and electrodes 360.

The heat dissipating substrate 300 is preferably but not limited to an aluminum substrate to facilitate dissipating heat generated by the light source 310.

The light source 310, located on the heat dissipating substrate 300, preferably includes an LED or LED chip.

The first dielectric liquid 320b covers the light source 310 and has a first dielectric constant. The second dielectric liquid 330b is located atop the first dielectric liquid 320b and has a second dielectric constant, and the second dielectric constant is higher than the first dielectric constant. Besides, the density of the first dielectric liquid 320b is preferably equal to that of the second dielectric liquid 330b, wherein the first dielectric liquid 320b is preferably a silicone oil liquid, and the second dielectric liquid 330b is preferably an alcohol liquid.

The enclosing wall 340, located on the heat dissipating substrate 300 for containing the first dielectric liquid 320b and the second dielectric liquid 330b. The enclosing wall 340 can be made of aluminum oxide or plastics. The inner surface of the enclosing wall 340 can be coated with a reflective film to increase the light output. In some applications, the inner surface of the enclosing wall 340 can be further coated with a fluorescent powder to provide a light mixing effect for the light source 310. For example, the fluorescent powder can be of yellow color when the light source 310 is of blue color to produce a white light output.

The transparent cover 350 is located on the enclosing wall 340 and can be made of glass or resin.

The electrodes 360 are located on a bottom face of the transparent cover 350 for applying a voltage to generate a dielectric force onto the second dielectric liquid 330b. The dielectric force can shape the curvature of the second dielectric liquid 330b to result in a desired focal length.

Figure 4:
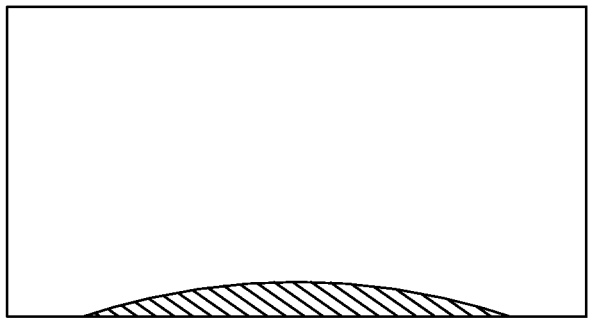
FIG. 4 illustrates three scenarios where a first dielectric liquid of FIG. 1a exhibits three curvatures in response to three different voltages applied on electrodes located on a heat dissipating substrate.
Figure 4:
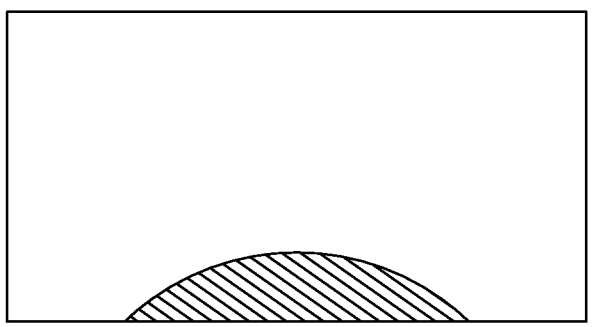
Figure 4:
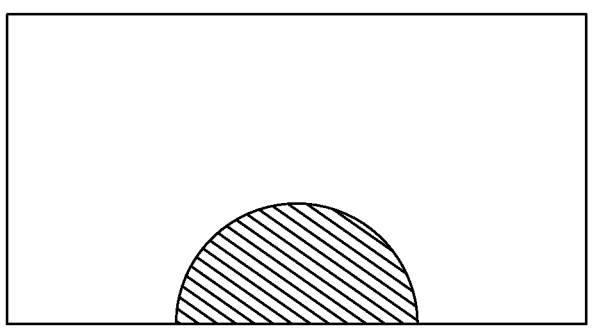

FIG. 4 illustrates three scenarios where the first dielectric liquid 130a of FIG. 1a exhibits three curvatures in response to three different voltages applied on the electrodes 120. As a result, by applying a corresponding voltage, a corresponding focal length and therefore a corresponding light pattern can be derived easily.

In conclusion, the present invention has the advantages as follow:

1. The present invention can offer a compact structure for a lighting device capable of changing light patterns.
2. The present invention can increase the lighting efficiency of a lighting device by incorporating a light source in a dielectric liquid lens.
3. The present invention can greatly improve the heat dissipation capacity of a lighting device by letting a dielectric liquid lens serve both the functions of shaping a light pattern and taking away the heat generated from a light source.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A lighting device capable of changing light patterns, comprising:
    a heat dissipating substrate;
    a light source, located on said heat dissipating substrate;
    an enclosing wall, located on said heat dissipating substrate;
    a first non-conductive dielectric liquid, located inside said enclosing wall, covering said light source, and having a first dielectric constant; and
    a second non-conductive dielectric liquid, located inside said enclosing wall, covering said first dielectric liquid, and having a second dielectric constant, wherein said first dielectric constant is higher than said second dielectric constant.

2. The lighting device capable of changing light patterns as claim 1, wherein said heat dissipating substrate comprises aluminum.

3. The lighting device capable of changing light patterns as claim 1, wherein said light source comprises a light emitting diode or light emitting diode chip.

4. The lighting device capable of changing light patterns as claim 1, wherein said first dielectric liquid is an alcohol liquid, and said second dielectric liquid is a silicone oil liquid.

5. The lighting device capable of changing light patterns as claim 1, further comprising at least two electrodes on said heat dissipating substrate for applying a voltage to generate a dielectric force onto said first dielectric liquid.

6. The lighting device capable of changing light patterns as claim 1, further comprising a transparent cover located on said enclosing wall, wherein said enclosing wall is made of plastics or aluminum oxide, and said transparent cover is made of glass or resin.

7. The lighting device capable of changing light patterns as claim 1, wherein said enclosing wall has an inner surface coated with a reflective film or a fluorescent powder.

8. A lighting device capable of changing light patterns, comprising:
    a heat dissipating substrate;
    a light source, located on said heat dissipating substrate;
    a first non-conductive dielectric liquid, covering said light source and having a first dielectric constant;
    a second non-conductive dielectric liquid, covering said first dielectric liquid and having a second dielectric constant, wherein said second dielectric constant is higher than said first dielectric constant; and
    an enclosing wall, located on said heat dissipating substrate for containing said first dielectric liquid and said second dielectric liquid.

9. The lighting device capable of changing light patterns as claim 8, wherein said heat dissipating substrate comprises aluminum.

10. The lighting device capable of changing light patterns as claim 8, wherein said light source comprises a light emitting diode or a light emitting diode chip.

11. The lighting device capable of changing light patterns as claim 8, wherein said first dielectric liquid is a silicone oil liquid and said second dielectric liquid is an alcohol liquid.

12. The lighting device capable of changing light patterns as claim 8, further comprising at least two electrodes on said heat dissipating substrate for applying a voltage to generate a dielectric force onto said first dielectric liquid.

13. The lighting device capable of changing light patterns as claim 8, wherein said enclosing wall is made of plastics or aluminum oxide.

14. The lighting device capable of changing light patterns as claim 8, wherein said enclosing wall has an inner surface coated with a reflective film or a fluorescent powder.

15. The lighting device capable of changing light patterns as claim 8, further comprising a transparent cover located on said enclosing wall.

16. The lighting device capable of changing light patterns as claim 15, wherein said transparent cover is made of glass or resin.

17. A lighting device capable of changing light patterns, comprising:
    a heat dissipating substrate;
    a light source, located on said heat dissipating substrate;
    an enclosing wall, located on said heat dissipating substrate;
    a first non-conductive dielectric liquid, located inside said enclosing wall, covering said light source, and having a first dielectric constant;
    a second non-conductive dielectric liquid, located inside said enclosing wall and atop said first dielectric liquid, and having a second dielectric constant;
    a transparent cover, located on said enclosing wall; and
    at least two electrodes, located on a bottom face of said transparent cover for applying a voltage to generate a dielectric force onto said second dielectric liquid.

18. The lighting device capable of changing light patterns as claim 17, wherein said first dielectric liquid is an alcohol liquid, and said second dielectric liquid is a silicone oil liquid.

19. The lighting device capable of changing light patterns as claim 17, wherein said first dielectric liquid is a silicone oil liquid, and said second dielectric liquid is an alcohol liquid.

20. The lighting device capable of changing light patterns as claim 17, wherein said heat dissipating substrate comprises aluminum, and said light source comprises a light emitting diode or light emitting diode chip.

* * * * *